Patented Jan. 14, 1930

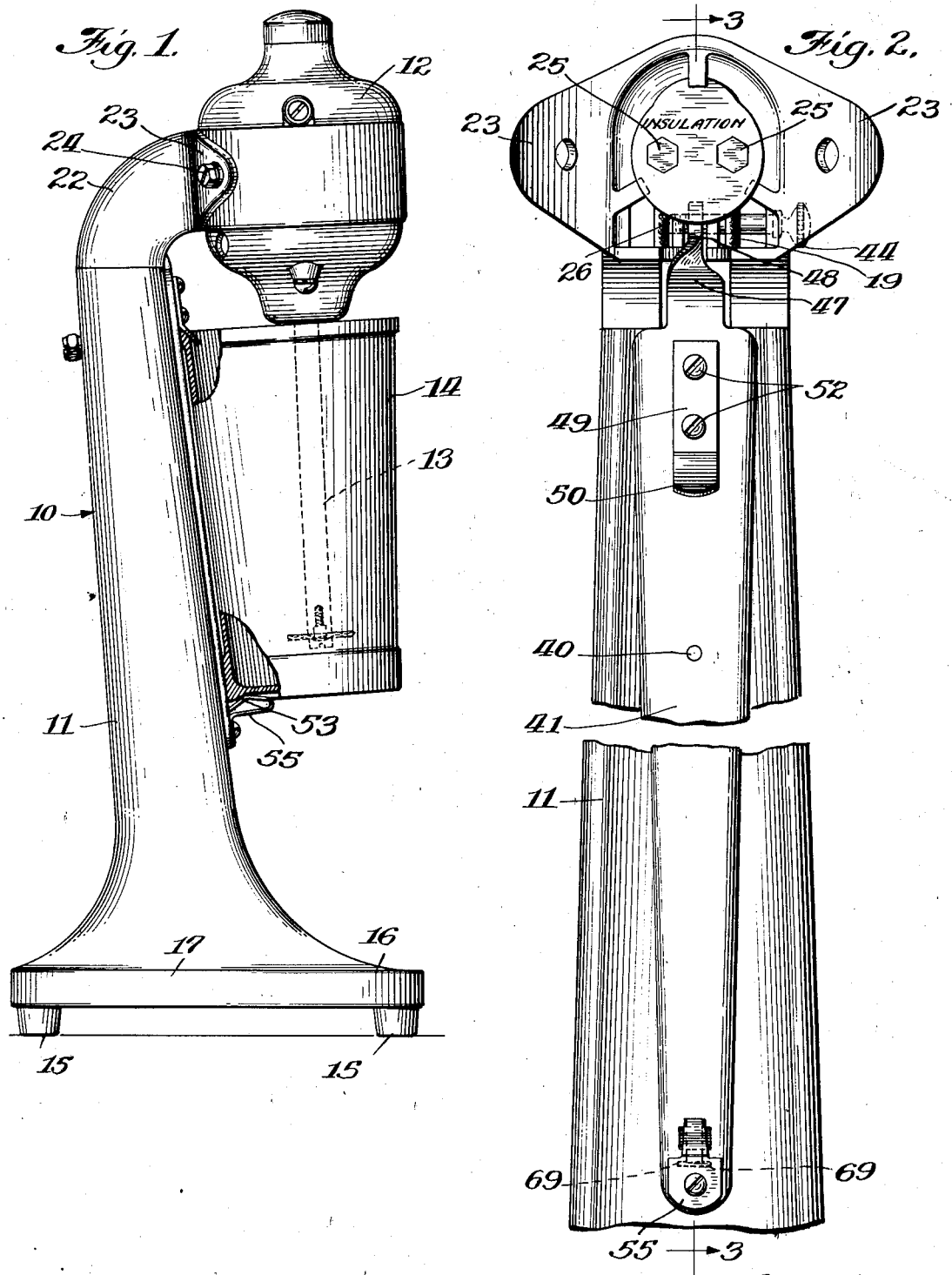

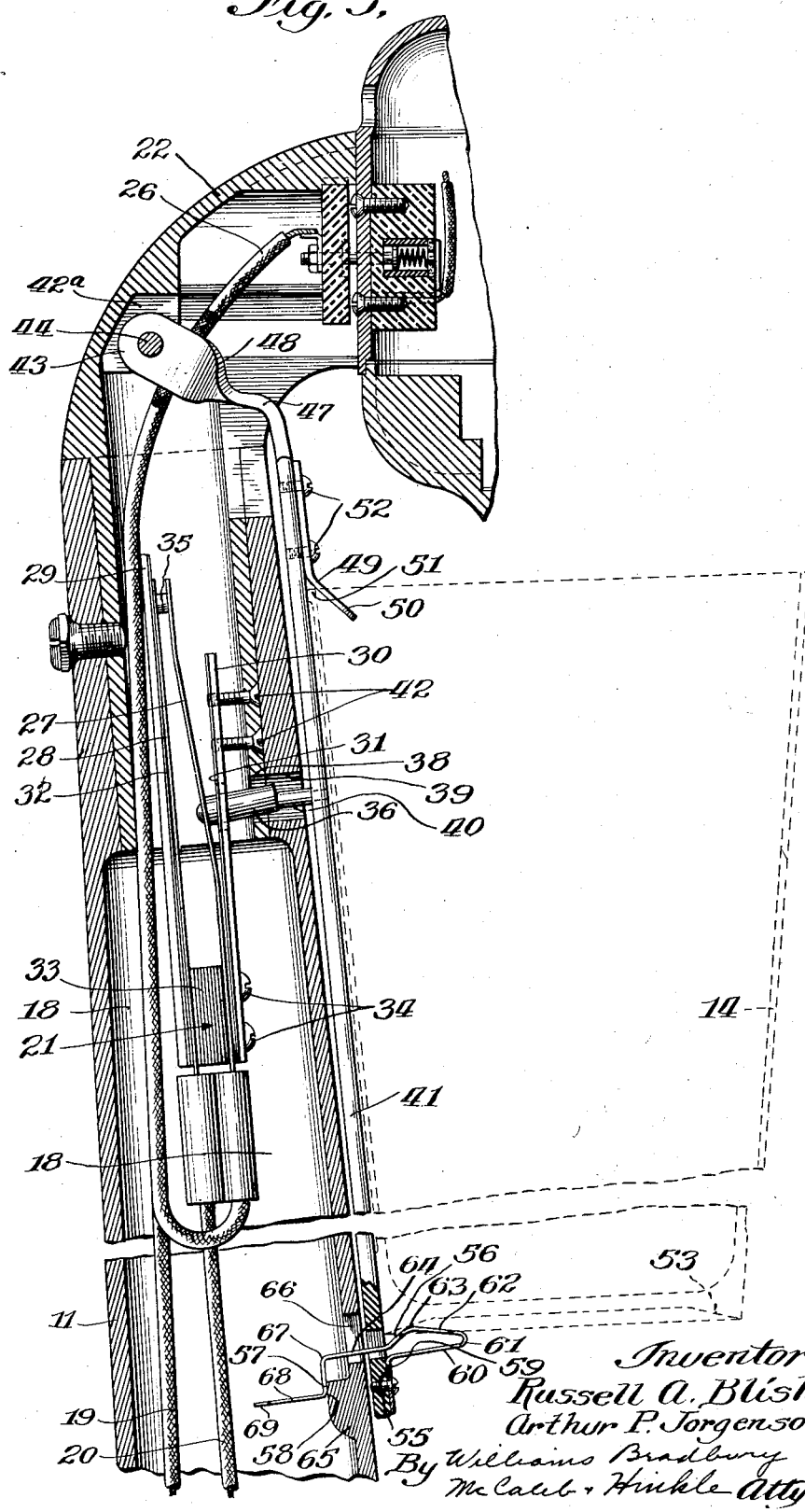

1,743,102

UNITED STATES PATENT OFFICE

RUSSELL A. BLISH AND ARTHUR P. JORGENSON, OF RACINE, WISCONSIN, ASSIGNORS TO ARNOLD ELECTRIC CO., OF RACINE, WISCONSIN, A CORPORATION OF WISCONSIN

DRINK MIXER

Application filed May 4, 1929. Serial No. 360,452.

The present invention relates to drink mixers, and is particularly concerned with drink mixers adapted to be actuated by the placing of a receptacle in operative position, or by the weight of the receptacle or its contents.

In drink mixers of this type, it is highly desirable that the receptacle be firmly secured in operative position about the mixer agitator to prevent rattling, splashing or spilling, and it is also desirable that the motor control switch be positively actuated to prevent vibration of the contacts and the consequent arcing which results in burning and pitting the contacts.

It is also necessary to reduce to a minimum of operations or movements required in the use of the mixer, so that an operator may serve a greater number of people with a minimum expenditure of time and effort, and consequently the device employed to accomplish the foregoing results should preferably be actuated coincident to the placing of the receptacle in operative position, as by the act of placing the receptacle or by the weight of the receptacle or its contents.

One of the objects of the present invention is the provision of a drink mixer which includes common means actuated by the placing of the receptacle for simultaneously securing the receptacle in operative position and accomplishing positive actuation of the motor control switch.

Another object is the provision of a drink mixer having resilient means for securing the receptacle against rattling and for simultaneously latching the motor control switch in closed position.

Another object is the provision of a drink mixer having means actuated by the removal of the receptacle for releasing said receptacle and for releasing a motor control switch which is positively secured in closed position during the operation of the mixer.

Another object is the provision of a drink mixer having a pivoted receptacle support for actuating a motor control switch, said support being resiliently held in receptive position by said switch, and means carried by said support for securing a receptacle thereon and for holding said support in position to positively secure the switch against vibration.

Other objects and advantages of the invention will be apparent from the following description and from the accompanying drawings, in which similar characters of reference indicate similar parts throughout the several views.

Referring to the drawings, of which there are two sheets;

Fig. 1 is a side elevational view of the drink mixer and receptacle with the parts in the operative position of the mixer; that is with the switch closed and the motor running;

Fig. 2 is an elevational view of the standard and receptacle support with the motor and receptacle removed and the parts in receptive position; that is, ready to receive the receptacle;

Fig. 3 is a medial sectional view taken through Fig. 1 in a plane parallel to the plane of the paper with the parts in running position.

Referring to Fig. 1, 10 indicates the drink mixer assembly in its entirety, the mixer preferably including a support or standard 11, a motor 12, an agitator 13 driven by the motor 12 and a receptacle 14.

In the embodiment chosen to illustrate the invention, the standard 11 comprises a cast metal base 17 having rubber feet 15 and a pair of forwardly extending portions 16 for guiding the receptacle into operative position. The base 17 is provided with a hollow interior conduit 18 for receiving the conductors 19 and 20 leading to a supply circuit, and for receiving an electric switch 21 for controlling the motor circuit. The standard 11 may be provided with a separate motor head 22 comprising a hollow cast metal member having a pair of curved attaching flanges 23 for engaging the casing of the motor 12 and for securing said motor to the standard by a pair of bolts 24. The motor head 22 is provided with contacts 25 adapted to engage contacts carried by the motor 12 and one conductor 19 may be connected to one of the contacts 25. The other contact 25 is connected by a conductor 26 to a movable switch contact 27, while the supply conductor 20 is connected to the fixed switch contact 28 so that the switch contacts are adapted to make and break the motor circuit.

The switch 21 may comprise a frame consisting of a pair of metal plates 29 and 30 separated by layers of insulation 31 and 32 from the resilient contact members 27 and 28. The metal plates 29 and 30, contact members 27 and 28 and the spacing members 33 of insulation may all be clamped together by a pair of screw bolts 34 passing through the plate 30, contacts and insulation and threaded into the plate 29, it being understood that the contact springs 27 and 28 are provided with enlarged apertures about the bolts 34 to effectively insulate the contact springs from each other and from the supporting plates.

The contact springs 27 and 28 may be provided with aligned contact points 35 and the movable contact spring 27 is provided with an actuating member or button 36 adapted to project through an aperture 38 in plate 20 and an aperture 39 in the standard 11 so that it may be engaged by a pin 40 carried by the receptacle support 41.

The switch 21 may be secured in the standard by a pair of screw bolts 42 passing through the neck of the motor head 22 and threaded into the plate 30, drawing the edges of the plate into engagement with the substantially cylindrical bore or conduit in the motor head 22.

The motor head 22 is provided upon its interior with a pair of forwardly projecting lugs 42ª spaced to receive the end 43 of motor support 41 and one of the lugs 42ª may be threaded to receive the end of a screw bolt 44 adapted to project into the motor head 22 through the lugs 41 for pivotally supporting the end 43 of motor support 41. In some embodiments of the invention, the motor head and base 17 may constitute an integral piece, but the provision of a separate motor head facilitates the assembly of the parts of the device with a minimum expenditure of time and labor.

It should also be understood that the present invention is not limited to the use of a specific type of receptacle support and other types of receptacle carriers may be used within the scope of the appended claims.

The receptacle support 41 comprises an elongated strip of sheet metal which may taper toward its lower end 45 and the receptacle support may be laterally curved to present a forward concave face 46 for better receiving the complementary surface upon the receptacle 14.

At its upper end the lever 41 is bent at 47 so that the upper end 43 may extend into the standard 11, while the main body of the lever 41 extends longitudinally of the standard. The end 43 may also be twisted at 48 through an angle of substantially 90 degrees, so that the end 43 may lie in a plane at right angles to the bolt 44 which pivotally supports this end of the lever.

The receptacle support or lever 41 is provided adjacent its upper end with means for engaging an upper part of the receptacle 14, which may comprise a sheet metal member 49 having a downwardly and forwardly projecting flange 50 for guiding the edge of the receptacle 14 into the slot 51 formed between said flange 50 and lever 41. The retaining member 49 is secured to the receptacle support 41 by any convenient fastening means such as a pair of screw bolts 52.

The receptacle 14 preferably comprises a sheet metal member of substantially the shape shown, which is provided with a depending annular shoulder 53 upon its bottom adjacent the outer edge. In the present embodiment, the annular shoulder 53 comprises a substantially frusto-conical portion, but any equivalent shape of shoulder may be used.

When the receptacle 14 is not in the operative position shown in Figs. 1 and 3, the receptacle support 41 is resiliently urged away from the standard 11 by the contact spring 27 acting through the pins 36 and 40 and the contact points 35 are open.

The receptacle support 41 is preferably provided with means for engaging and securing the receptacle 14 in operative position and for simultaneously holding the switch 21 in closed position, said means comprising a resilient metal member or spring 55 carried by the lower end of the receptacle support 41.

The spring 55 is provided with a shoulder 56 for engaging the depending annular shoulder 53 of receptacle 14, and with a shoulder 57 for engaging a shoulder 58 carried by the standard 11.

The spring 55 may thus be formed with an attaching flange 59 and a substantially horizontal flange 60 at right angles thereto, and adapted to extend under the container 14. The spring is bent back upon itself at 61 and extends obliquely upward and toward the standard 11 to form a camming surface 62 capable of being engaged by container 14 when the container is moved into operative position.

At the point 63 the spring 55 is bent downward forming the shoulder 56 for engaging the annular shoulder 53 on receptacle 14, and the spring 55 is also provided with a portion 64 adapted to extend through an aperture 65 in supporting member 41 and through an aperture 66 in standard 11. Within the standard 11 the spring 55 is bent downward at 67 forming the shoulder 57, and the spring 55 is provided with an extension 68 having laterally projecting lugs 69 adapted to engage the sides of the standard 11 adjacent opening 66 to definitely limit the counterclockwise pivotal movement of supporting member 41.

The proportions of the parts are such that when the container 14 is in the position of Fig. 3, the spring 55 resiliently engages the bottom of the container 14 inside of annular shoulder 53 and the container is firmly secured between spring 55 and sheet metal member 49. At the same time the container 14 has forced the spring 55 downward until the shoulder 57 engages behind shoulder 58 on the standard, and the receptacle 41 has been pivotally moved clockwise to a position adjacent the standard where pins 36 and 40 move the contact points 35 to closed position.

The operation of the drink mixer is as follows:

When the receptacle support 41 is in receptive position its lower end is slightly spaced from the standard 11, being urged to this position by the movable contact spring 27 and the shoulders 69 on spring 55 constitute stop members for preventing further movement of receptacle support 41 in a counterclockwise direction. The receptacle 14 may be inserted below the agitator 13 with one of the upper edges of the receptacle between the agitator and spring 55, and the upper edge of the receptacle may be inserted in the slot 51 between member 49 and receptacle support 41.

The bottom of the receptacle may then be pivoted in a counterclockwise direction to the position of Figs. 1 and 3, the lower edge of the receptacle engaging spring 55 to move receptacle support 41 in a clockwise direction, causing the pins 36 and 40 to move the contact points 35 of the switch into engagement. When the receptacle support 41 has reached the position of Fig. 3, its lower end striking standard 11, the continued pivotal movement of receptacle 14 will engage the camming surface 62 on spring 55 moving the inner end of spring 55 downward and causing shoulder 57 to engage behind shoulder 58.

When the shoulder 53 passes point 63 on spring 53, the spring 55 will rise again slightly to engage behind shoulder 53, securing receptacle 14 upon the support 41 and latching the switch contact points 35 in closed position.

The motor is thus actuated by the mere placing of the receptacle in operative position and the motor control switch is simultaneously latched in closed position, so that there is no possibility of vibration of the contacts or of the receptacle. The motor may be stopped and the receptacle removed by merely pulling outward on the bottom of the receptacle and moving the receptacle down from about the agitator 13, the release of the receptacle simultaneously effecting the release of the motor control switch.

It will thus be observed that the present device is adapted to insure the positive actuation of the switch and to prevent vibration of the switch contacts due to the vibration incident to the operation of a motor. The device is also adapted to securely fasten the receptacle in operative position, so that there is no possibility of spilling or splashing.

While we have illustrated and described a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim is new and desire to secure by Letters Patent of the United States, is:

1. In a drink mixer, the combination of a standard with a motor and motor switch, a movable receptacle support for holding a receptacle and actuating said switch, and a latching member for said receptacle support to retain said switch in closed position, comprising a resilient member carried by said receptacle support, said resilient member having an integral extension serving as a stop for said receptacle support.

2. In a drink mixer, the combination of a standard with a motor and motor switch, a movable receptacle support for holding a receptacle and actuating said switch, comprising a pivoted lever, a shoulder carried by said lever for engaging an upper portion of a receptacle, and a resilient member for engaging the bottom of said receptacle, said latter member comprising a spring formed with an attaching flange, a retaining shoulder for said receptacle, and a latching shoulder for engaging a shoulder on said standard to latch said switch in closed position.

3. In a drink mixer, the combination of a standard with a motor and motor switch, a movable receptacle support for holding a receptacle and actuating said switch, comprising a pivoted lever, a shoulder carried by said lever for engaging an upper portion of a receptacle, and a resilient member for engaging the bottom of said receptacle, said latter member comprising a spring formed with an attaching flange, a retaining shoulder for said receptacle, and a latching shoulder for engaging a shoulder on said standard to latch said switch in closed position, and said spring having integral laterally projecting flanges for limiting movement of said receptacle support.

In witness whereof, we hereunto subscribe our names this 30th day of April, 1929.

RUSSELL A. BLISH.
ARTHUR P. JORGENSON.